Aug. 8, 1939. G. L. CUNNINGHAM 2,169,066
PREPARATION OF SODIUM CHLORATE AND SODIUM CHLORITE
AND THE SEPARATION THEREOF
Filed July 1, 1938
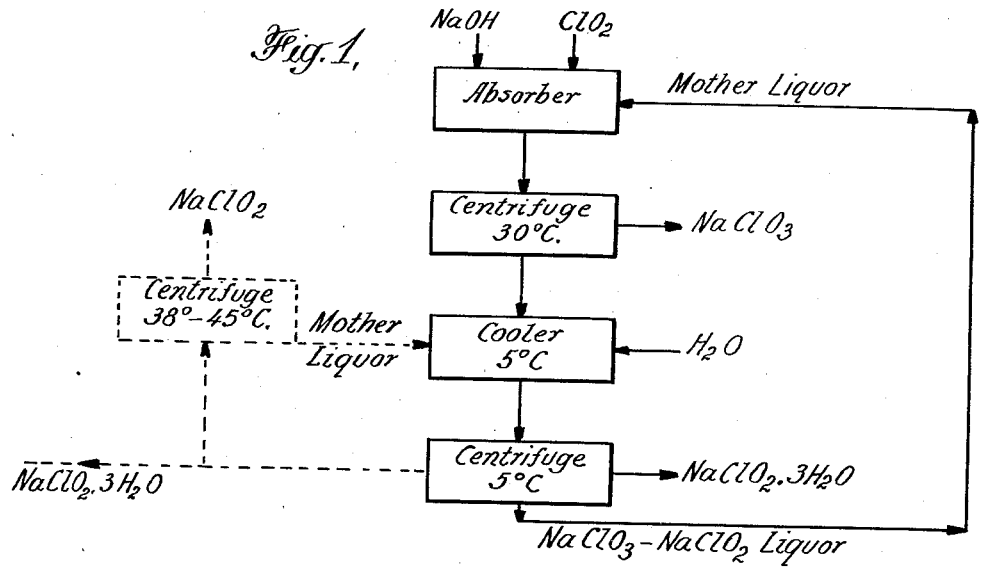
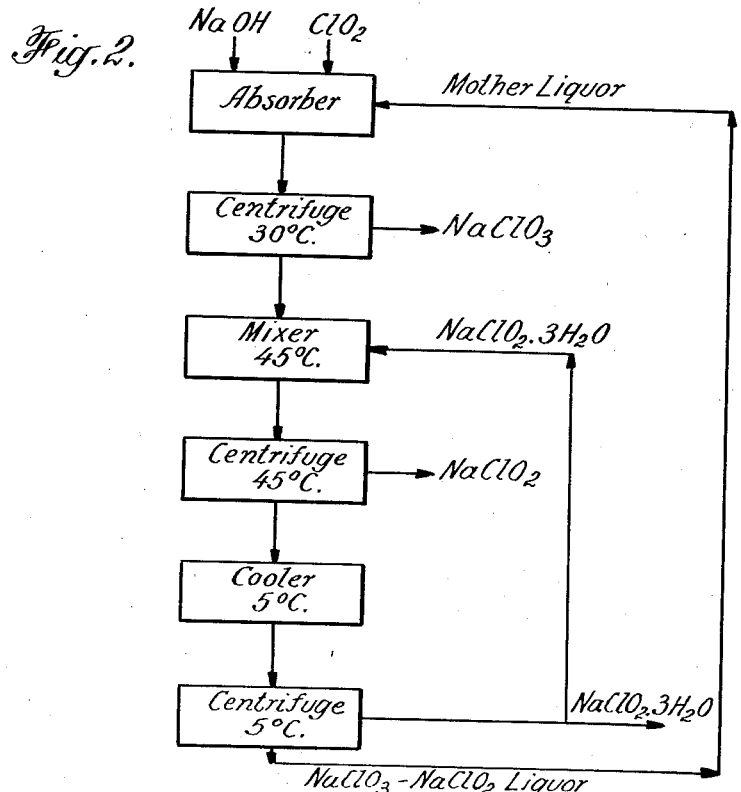
INVENTOR
George L. Cunningham
BY
ATTORNEYS Patented Aug. 8, 1939

2,169,066

UNITED STATES PATENT OFFICE 2,169,066

PREPARATION OF SODIUM CHLORATE AND SODIUM CHLORITE AND THE SEPARATION THEREOF

George Lewis Cunningham, Niagara Falls, N. Y., assignor to The Mathieson Alkali Works, Inc., New York, N. Y., a corporation of Virginia Application July 1, 1938, Serial No. 216,390

11 Claims. (Cl. 23—85)

This invention relates to improvements in the separation and recovery of sodium chlorate, $NaClO_3$, sodium chlorite, $NaClO_2$, and sodium chlorite trihydrate, $NaClO_2.3H_2O$ from aqueous solutions containing sodium chlorate and sodium chlorite, and particularly from solutions produced by reacting chlorine dioxide with aqueous caustic soda.

When chlorine dioxide is absorbed by an aqueous caustic soda solution, sodium chlorate and sodium chlorite are formed in equal molecular proportions as follows:

$$2ClO_2 + 2NaOH \rightarrow NaClO_3 + NaClO_2 + H_2O$$

A satisfactory method for the separation and separate recovery directly from the solution of the sodium chlorate and sodium chlorite so formed has not, so far as I am aware, been proposed. The application and use of the above reaction in the preparation of sodium chlorite has, in consequence, been limited.

I have discovered that an aqueous solution, having dissolved therein suitable proportions of sodium chlorate and sodium chlorite, will precipitate sodium chlorate substantially free from sodium chlorite when adjusted to a temperature of about 30° C. and that, when the temperature of such a solution is lowered substantially below 30° C., there is a tendency to simultaneously precipitate sodium chlorate and sodium chlorite trihydrate. When the temperature of such a solution is held for a time at about 30° C. to permit sodium chlorate to precipitate in a relatively pure condition, and subsequently the temperature is increased substantially above 30° C. I have found that anhydrous sodium chlorite precipitates from the solution free from chlorate. I have found moreover, that the transition temperature between the chlorite trihydrate and the anhydrous chlorite is 38° C., and that, if substantial proportions of sodium chlorate are present, the transition temperature may be lowered to 31.8° C. when the solution is saturated with respect to chlorate. I have further found that when the temperature of such a solution is lowered substantially below 30° C., for example to 5° C., sodium chlorite trihydrate may be recovered from the solution by crystallization. These discoveries are applied in the process of the present invention which comprehends a procedure suitable to accomplish the separation of sodium chlorate and sodium chlorite from aqueous solutions and more specifically provides a method whereby these two salts may be recovered from solutions resulting from the reaction between chlorine dioxide and sodium hydroxide. In accordance with my invention chlorine dioxide is absorbed in an aqueous solution containing sodium hydroxide in suitable amount until the solution is substantially neutral. It will be apparent from the above equation that the amount of $ClO_2$ added should be equal, or substantially equal to the molar quantity of the NaOH present in the solution to accomplish this result. The aqueous solution to which the sodium hydroxide is added is advantageously a solution already containing sodium chlorate and sodium chlorite, for example, the mother liquor resulting from the final separation step of the process. I have found that by a suitable procedure the formed sodium chlorate, sodium chlorite and also sodium chlorite trihydrate may be separated from such solutions in a pure state. These and other aspects of the separation will be more fully understood in the light of the accompanying drawings which are flow sheets showing the sequence of steps in three alternative methods of carrying out the process of the invention.

In accordance with one embodiment, as illustrated in Fig. 1, the temperature of an aqueous solution containing sodium chlorate and sodium chlorite is adjusted to about 30° C. at which point the sodium chlorate in excess of the limit of solubility in the particular solution used will separate from the solution and may be removed by a centrifuge or by filtration. A minor proportion of water is added to the mother liquor resulting from the separation in order to produce a solution having a sodium chlorate concentration less than the maximum solubility of sodium chlorate in the presence of sodium chlorite in water at a temperature of about 5° C. By this procedure contamination of subsequently crystallized chlorite trihydrate by small quantities of chlorate is avoided. The solution is cooled to about 5° C. and the precipitated chlorite in the form of the trihydrate is removed by centrifugation. The mother liquor which will contain approximately equimolar quantities of chlorate and chlorite may then be returned to the absorber vessel and sodium hydroxide and chlorine dioxide added to render the process cyclic. As shown in Fig. 1, NaOH and $ClO_2$ are introduced into an absorber to produce additional quantities of chlorite and chlorate in the mother liquor which has been recycled from the chlorite trihydrate separation. The following experimental example will serve to illustrate the invention in accordance with this embodiment.

*Example No. 1.*—To a mother liquor containing 36 gm. NaClO₃, 32.0 gm. NaClO₂ and 69.7 gm. H₂O, 31.1 gm. NaOH and 52.5 gm. ClO₂ are added. The solution is brought to 30° C. and 41.4 gm. NaClO₃ are removed by using a filter or centrifuge. 14.4 gm. H₂O are added to the mother liquor and it is cooled at 5° C. 56.2 gm. NaClO₂.3H₂O are removed. The mother liquor now contains 36 gm. NaClO₃, 32 gm. NaClO₂ and 69.7 gm. H₂O and the cycle is repeated.

A second embodiment of my invention involves certain variations in the just described procedure which are indicated in dotted lines in Fig. 1, and which permit the separate recovery from the process of anhydrous sodium chlorite in addition to quantities of sodium chlorite trihydrate. In this method of procedure sodium chlorate is separated from a solution adjusted to a temperature of about 30° C. which contains sodium chlorite and chlorate. At this point additional sodium chlorite and water are added to the solution. This is accomplished with particular advantage by separately heating sodium chlorite trihydrate crystals to a temperature in excess of about 38° C., and preferably between 38° C. and 45° C., whereby the crystals are transformed into a solution of chlorite in which is suspended precipitated anhydrous sodium chlorite which is then separated by appropriate means such as by centrifuging, and the mother liquor from the separation added to the solution remaining from the above-mentioned chlorate separation. The mixed solution is cooled to a temperature of about 5° C. without addition of water other than that added with the sodium chlorite which was derived from the trihydrate crystals, and a further quantity of precipitated trihydrate is separated from the solution. The separated trihydrate or at least a portion thereof may advantageously be heated to produce anhydrous chlorite and at the same time yield a solution of chlorite which may be returned to the process subsequent to the chlorate separation as above described. In this method of operation important economies are also achieved by cyclically returning the sodium chlorite-sodium chlorate liquor from the trihydrate separation to the absorber vessel to serve as the absorption medium for chlorine dioxide after an additional quantity of NaOH has been added thereto. The following experimental example illustrates this method of operation.

*Example No. II.*—To a mother liquor containing 36.0 gm. NaClO₃, 32.0 gm. NaClO₂ and 69.7 gm. H₂O, 31.1 gm. NaOH and 52.5 gm. ClO₂ are added. The solution is brought to 30° C. and 41.4 gm. NaClO₃ are removed. 119.6 gm. NaClO₂.3H₂O are heated to 45° C., the crystals will melt and 24.4 parts anhydrous NaClO₂ is filtered off. The mother liquor from this operation is added to the mother liquor from the sodium chlorate crystals. The combined mother liquor is cooled to 5° C., 136.75 gm. NaClO₂.3H₂O will be precipitated. The mother liquor now contains 36 gm. NaClO₃, 32.0 gm. NaClO₂ and 69.7 gm. H₂O and is used to repeat the cycle.

In accordance with a third embodiment of my invention as illustrated in Fig. 2 of the drawing, a solution containing sodium chlorite and sodium chlorate is adjusted to a temperature of about 30° C., and the precipitated sodium chlorate separated by suitable means, the mother liquor from the separation is transferred to a mixing vessel to which is added a proportion of sodium chlorite trihydrate and the temperature of the mixture adjusted to about 45° C. Anhydrous sodium chlorite is precipitated and is removed from the solution. Following this separation the mother liquor may be cooled to about 5° C. to precipitate sodium chlorite trihydrate which is separated from the solution by centrifugation, for example. The sodium chlorite trihydrate separated by this step, or at least a part thereof, may with advantage be returned to the mixer containing the mother liquor from the chlorate separation which is regulated to a temperature of 45° C. In this embodiment, as in the previous ones, the chlorate-chlorite liquor resulting from the trihydrate separation may be returned to an absorber vessel where sodium hydroxide is added followed by absorption therein of chlorine dioxide. The following experimental example illustrates an operation in accordance with this embodiment.

*Example No. III.*—To a mother liquor containing 36.0 gm. NaClO₃, 32.0 gm. NaClO₂ and 69.7 gm. H₂O, 31.1 gm. NaOH and 52.5 gm. ClO₂ are added. The solution is brought to 30° C. and 41.4 gm. NaClO₃ are removed. To this solution 224.0 gm. NaClO₂.3H₂O are added and the solution brought to 45° C. 31.39 gm. anhydrous NaClO₂ can be removed by using a filter or centrifuge. The mother liquor is brought to 5° C. 230.0 gm. NaClO₂.3H₂O are removed. This sodium chlorite trihydrate is used to add back in the above, 6.0 gm. NaClO₂.3H₂O being in excess. To the mother liquor from the above 5° C. step, 31.1 gm. NaOH and 52.5 gm. ClO₂ are added and the cycle is repeated.

What I claim is:

1. A process for the preparation and separate recovery of sodium chlorate and sodium chlorite which comprises introducing chlorine dioxide in an amount sufficient to produce a substantially neutral solution into an aqueous solution containing sodium hydroxide, adjusting the temperature of the solution to about 30° C., separating the resulting precipitated sodium chlorate, diluting the remaining solution until the concentration of sodium chlorate therein is less than the maximum solubility of sodium chlorate in the presence of the sodium chlorite and water in the solution at a temperature of about 5° C., cooling said solution to about 5° C. and separating the resulting precipitated sodium chlorite in the form of the trihydrate.

2. A process for the preparation and separate recovery of sodium chlorate and sodium chlorite which comprises adding sodium hydroxide to an aqueous solution containing sodium chlorate and sodium chlorite and thereafter introducing into said solution chloride dioxide in an amount sufficient to produce a substantially neutral solution, adjusting the temperature of the solution to about 30° C., separating the resulting precipitated sodium chlorite, diluting the remaining solution until the concentration of sodium chlorate therein is less than the maximum solubility of sodium chlorate in the presence of the sodium chlorite and water in the solution at a temperature of about 5° C., cooling said solution to about 5° C., separating the resulting precipitated sodium chlorite in the form of the trihydrate, and returning the mother liquor containing sodium chlorate and sodium chlorite to further addition of sodium hydroxide and chlorine dioxide as first recited.

3. A process for the preparation and separate recovery of sodium chlorate and sodium chlorite which comprises introducing chlorine dioxide in an amount sufficient to produce a substantially neutral solution into an aqueous solution containing sodium hydroxide, adjusting the temperature of the solution to about 30° C., separating the precipitated sodium chlorate, adding water and sodium chlorite to the remaining solution, cooling the resulting solution to a temperature of about 5° C. and separating the precipitated sodium chlorite trihydrate.

4. A process for the preparation and separate recovery of sodium chlorate and sodium chlorite which comprises introducing chlorine dioxide in an amount sufficient to produce a substantially neutral solution into an aqueous solution containing sodium hydroxide, adjusting the temperature of the solution to about 30° C., separating the precipitated sodium chlorate, separately heating sodium chlorite trihydrate to a temperature upwards of about 38° C. and separating anhydrous sodium chlorite therefrom, adding the mother liquor from said separation and containing sodium chlorite to the solution from the sodium chlorate separation, cooling the mixed solution to about 5° C., separating the precipitated sodium chlorite trihydrate, and subjecting at least a part of the separated trihydrate salt to the said heating treatment at a temperature upwards of about 38° C. to recover further quantities of anhydrous sodium chlorite.

5. A process for the preparation and separate recovery of sodium chlorate and sodium chlorite which comprises adding sodium hydroxide to an aqueous solution containing sodium chlorate and sodium chlorite and thereafter introducing into said solution chlorine dioxide in an amount sufficient to produce a substantially neutral solution, adjusting the temperature of the solution to about 30° C., separating the precipitated sodium chlorate, separately heating sodium chlorite trihydrate to a temperature upwards of about 38° C. and separating anhydrous sodium chlorite therefrom, adding the mother liquor from said separation and containing sodium chlorite to the solution from the sodium chlorate separation, cooling the mixed solution to about 5° C. separating the precipitated sodium chlorite trihydrate, subjecting at least a part of the separated trihydrate salt to the said heating treatment at a temperature upwards of about 38° C. to recover further quantities of anhydrous sodium chlorite, and returning the mother liquor from the trihydrate separation containing sodium chlorate and sodium chlorite to further addition of sodium hydroxide and chlorine dioxide as first recited.

6. A process for the preparation and separate recovery of sodium chlorate and sodium chlorite which comprises introducing chlorine dioxide in an amount sufficient to produce a substantially neutral solution into an aqueous solution of sodium hydroxide, adjusting the temperature of the solution to about 30° C., separating the precipitated sodium chlorate, adding sodium chlorite trihydrate to the resulting solution, heating the solution to a temperature of about 45° C., and separating the precipitated anhydrous sodium chlorite.

7. A process for the preparation and separate recovery of sodium chlorate and sodium chlorite which comprises introducing chlorine dioxide in an amount sufficient to produce a substantially neutral solution into an aqueous solution of sodium hydroxide, adjusting the temperature of the solution to about 30° C., separating the precipitated sodium chlorate, adding sodium chlorite trihydrate to the resulting solution, heating the solution to a temperature of about 45° C., separating the precipitated anhydrous sodium chlorite, cooling the resulting solution to about 5° C., and separating the precipitated sodium chlorite trihydrate.

8. A process for the preparation and separate recovery of sodium chlorate and sodium chlorite which comprises adding sodium hydroxide to an aqueous solution containing sodium chlorate and sodium chlorite and thereafter introducing into said solution chlorine dioxide in an amount sufficient to produce a substantially neutral solution, adjusting the temperature of the solution to about 30° C., separating the precipitated sodium chlorate, adding sodium chlorite trihydrate to the resulting solution, heating the solution to a temperature of about 45° C., separating the precipitated anhydrous sodium chlorite, cooling the resulting solution to about 5° C., separating the precipitated sodium chlorite trihydrate, returning at least a portion of the separated trihydrate to the solution from the chlorate separation, and returning the mother liquor from the trihydrate separation containing sodium chlorate and sodium chlorite to further addition of sodium hydroxide and chlorine dioxide as first recited.

9. The method of separately recovering sodium chlorate and sodium chlorite from an aqueous solution containing said salts which comprises adjusting the temperature of the solution to about 30° C., separating the precipitated sodium chlorate, diluting the remaining solution until the concentration of sodium chlorate therein is less than the maximum solubility of sodium chlorate in the presence of the sodium chlorite and water in the solution at a temperature of about 5° C., cooling said solution to about 5° C., and separating the precipitated sodium chlorite in the form of the trihydrate.

10. The method of separately recovering sodium chlorate and sodium chlorite from an aqueous solution containing said salts which comprises adjusting the temperature of the solution to about 30° C., separating the precipitated sodium chlorate, separately heating sodium chlorite trihydrate to a temperature upwards of about 38° C., and separating anhydrous sodium chlorite therefrom, adding the mother liquor from said separation and containing sodium chlorite to the solution from the sodium chlorate separation, cooling the mixed solution to about 5° C., separating the precipitated sodium chlorite trihydrate, and subjecting at least a part of the separated trihydrate salt to the said heating treatment at a temperature upwards of about 38° C. to recover further quantities of anhydrous sodium chlorite.

11. The method of separately recovering sodium chlorate and sodium chlorite from an aqueous solution containing said salts which comprises adjusting the temperature of the solution to about 30° C., separating the precipitated sodium chlorate, adding sodium chlorite trihydrate to the resulting solution, heating the solution to a temperature of about 45° C., separating the precipitated anhydrous sodium chlorite, cooling the resulting solution to about 5° C., and separating the precipitated sodium chlorite trihydrate.

GEORGE LEWIS CUNNINGHAM.